United States Patent
Li et al.

(10) Patent No.: US 11,487,000 B2
(45) Date of Patent: Nov. 1, 2022

(54) MILLIMETER WAVE-BASED FIRE DETECTING AND RESCUING METHOD, AND SYSTEM THEREOF

(71) Applicant: SHENZHEN JAGUAR WAVE TECHNOLOGY LTD., Shenzhen (CN)

(72) Inventors: Haibo Li, Shenzhen (CN); Wei Shin Tung, Shenzhen (CN)

(73) Assignee: SHENZHEN JAGUAR WAVE TECHNOLOGY LTD., Shenzhen (CN)

( * ) Notice: Subject to any disclaimer, the term of this patent is extended or adjusted under 35 U.S.C. 154(b) by 106 days.

(21) Appl. No.: 17/219,807

(22) Filed: Mar. 31, 2021

(65) Prior Publication Data

US 2022/0099822 A1    Mar. 31, 2022

(30) Foreign Application Priority Data

Sep. 25, 2020   (CN) .......................... 202011024689.3

(51) Int. Cl.
   *G01S 13/88*   (2006.01)
   *G01S 13/95*   (2006.01)
   *G08B 17/10*   (2006.01)

(52) U.S. Cl.
   CPC .......... *G01S 13/886* (2013.01); *G01S 13/951* (2013.01); *G08B 17/10* (2013.01)

(58) Field of Classification Search
   None
   See application file for complete search history.

(56) References Cited

U.S. PATENT DOCUMENTS

| | | | |
|---|---|---|---|
| 10,845,774 B2* | 11/2020 | Baxi | G05B 19/048 |
| 11,404,441 B2* | 8/2022 | Song | H01L 27/11548 |
| 2010/0117849 A1* | 5/2010 | Clayton | G08B 13/19682 |
| | | | 340/691.6 |
| 2011/0155397 A1* | 6/2011 | Icove | G08B 29/183 |
| | | | 169/16 |

(Continued)

FOREIGN PATENT DOCUMENTS

| | | | | |
|---|---|---|---|---|
| KR | 101624510 B1 * | 5/2016 | ............. | G08B 17/10 |
| WO | WO-2017137393 A1 * | 8/2017 | ............. | G08B 17/10 |

*Primary Examiner* — Fekadeselassie Girma

(57) ABSTRACT

A system for millimeter wave-based fire detecting and rescuing and a method thereof are provided, the system including: an environmental obtaining device, a millimeter wave detector, a wireless transmitter, and a monitoring terminal, which are interconnected and arranged in an environment. The environmental obtaining device is configured to collect environmental information and send the environmental information to the wireless transmitter when the environmental information is determined to include fire information. The millimeter wave detector is configured to perform all-weather scanning on the environment to obtain characteristics and location information of a living organism in the environment, and send the characteristics and location information to the wireless transmitter. The wireless transmitter is configured to report the above information to the monitoring terminal through a millimeter wave, and the monitoring terminal stores the characteristics and location information. The monitoring terminal is configured to continuously compare changes in the characteristics and location information.

20 Claims, 4 Drawing Sheets

(56) References Cited

U.S. PATENT DOCUMENTS

2017/0134171 A1\* 5/2017 Woxland ............. H04W 12/086
2018/0099170 A1\* 4/2018 Baldino ................... B05B 1/02
2019/0253254 A1\* 8/2019 Brownlee ............. H04L 9/0618
2020/0162458 A1\* 5/2020 Setlur ................ H04N 21/4402

\* cited by examiner

MILLIMETER WAVE-BASED FIRE DETECTING AND RESCUING METHOD, AND SYSTEM THEREOF

CROSS REFERENCE

The present application claims foreign priority of Chinese Patent Applications No. 202011024689.3, field on Sep. 25, 2020 in the State Intellectual Property Office of China, the entire contents of which are hereby incorporated by reference.

TECHNICAL FIELD

The present disclosure relates to the field of fire detection technologies, and in particular to a millimeter wave-based fire detecting and rescuing method, and a system thereof.

BACKGROUND

Fires usually cause significant damage to people's lives and property. Generally, fire detectors can only simply detect environmental conditions and cannot provide effective disaster information when the fire becomes large.

For example, when a fire occurs in a building, infrared sensors are susceptible to interference from heat sources, resulting in poor passive infrared penetration. In this way, infrared radiation from a human body may be blocked and not received by the detector. When the ambient temperature and human body temperature are close, the detection and sensitivity of the infrared sensor is significantly reduced. Or, a video transmission equipment is installed in the places required to be monitored to obtain video information. The human body in the video information is thus identified through an algorithm target identification. However, the environment of the fire scene is often very complex, it is difficult to identify the human target through the video information obtained by the video system. Moreover, 3G/4G or Bluetooth technology is at present applied to transmit the fire information obtained by the detector. The transmission is slow, and the collected information may not be reported to a monitoring terminal in a timely manner.

Rescue of trapped persons after a fire is a crucial aspect. However, due to the above defects of the existing detection and rescue system, it is difficult to determine the location and vital signs of the trapped persons in the shortest possible time, resulting in missing the best rescue time and even loss of life.

SUMMARY OF THE DISCLOSURE

The present disclosure provides a system for millimeter wave-based fire detecting and rescuing, including: an environmental obtaining device, a millimeter wave detector, a wireless transmitter, and a monitoring terminal; wherein the environmental obtaining device, the millimeter wave detector and the wireless transmitter are interconnected and arranged in an environment to be detected; the environmental obtaining device is configured to collect current environmental information and send the environmental information to the wireless transmitter in response to the environmental information being determined to include fire information; the millimeter wave detector is configured to perform an all-weather scanning on the environment to be detected to obtain characteristics and location information of a living organism in the environment to be detected, and send the characteristics and the location information of the living organism to the wireless transmitter; the wireless transmitter is configured to report the environmental information, the characteristics and the location information of the living organism to the monitoring terminal through a millimeter wave to cause the monitoring terminal to store the characteristics and the location information of the living organism; the monitoring terminal is configured to continuously compare changes in the characteristics and the location information of the living organism detected by the millimeter wave before and during a tire, such that the living organism is searched and rescued based on the changes.

The present disclosure further provides a method for millimeter wave-based fire detecting and rescuing, implemented by a system for millimeter wave-based fire detecting and rescuing, the system including an environmental obtaining device, a millimeter wave detector, a wireless transmitter, and a monitoring terminal; wherein the environmental obtaining device, the millimeter wave detector and the wireless transmitter are interconnected and arranged in an environment to be detected; wherein the method includes: collecting current environmental information through the environmental obtaining device; and in response to the environmental information being determined to include fire information, sending the environmental information to the wireless transmitter through the environmental obtaining device; performing an all-weather scanning on the environment to be detected through the millimeter wave detector; and sending characteristics and location information of a living organism in the environment to be detected to the wireless transmitter through the millimeter wave detector; reporting the environmental information, the characteristics and the location information of the living organism to the monitoring terminal through the wireless transmitter via a millimeter wave to cause the monitoring terminal to store the characteristics and the location information of the living organism; and continuously comparing changes of the characteristics and the location information of the living organism detected via the millimeter wave before and during the fire through the monitoring terminal; and searching and rescuing the living organism based on the changes.

BRIEF DESCRIPTION OF THE DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

The following is a clear and complete description of the technical solutions in the embodiments of the present disclosure in conjunction with the accompanying drawings. Obviously, the described embodiments are only a part of the embodiments of the present disclosure, but not all of them. Based on the embodiments in the present disclosure, all other embodiments obtained by those skilled in the art without making creative labor fall within the scope of the present disclosure.

The terminology used in the present disclosure is intended solely for the purpose of describing a particular embodiment and is not intended to limit the present disclosure. The singular forms of "one", "the", and "said" as used in the embodiments and the appended claims are also intended to include the form of plurality, unless clearly indicated above. Terms of "a plurality of" generally encompass at least two, but does not exclude the inclusion of at least one.

It should be understood that the term "and/or" used herein is only a description of the association relationship of the associated objects, indicating that three relationships can exist. For example, A and/or B, which can indicate the following three cases: A alone, both A and B and B alone. In addition, the character "I" generally indicates that the objects associated before and after are in an "or" relationship.

It is to be understood that terms "include", "comprise", or any other variation thereof are intended to cover non-exclusive inclusion such that a process, method, article, or apparatus comprising a set of elements includes not only those elements, but also other elements not expressly listed, or elements that are inherent to such process, method, article, or apparatus. Without further limitation, the fact that an element defined by the statement "include" does not exclude the existence of additional elements in the process, method, article, or apparatus that includes the element.

This present disclosure will be described in detail below in conjunction with the accompanying drawings and embodiments.

Figure 1:
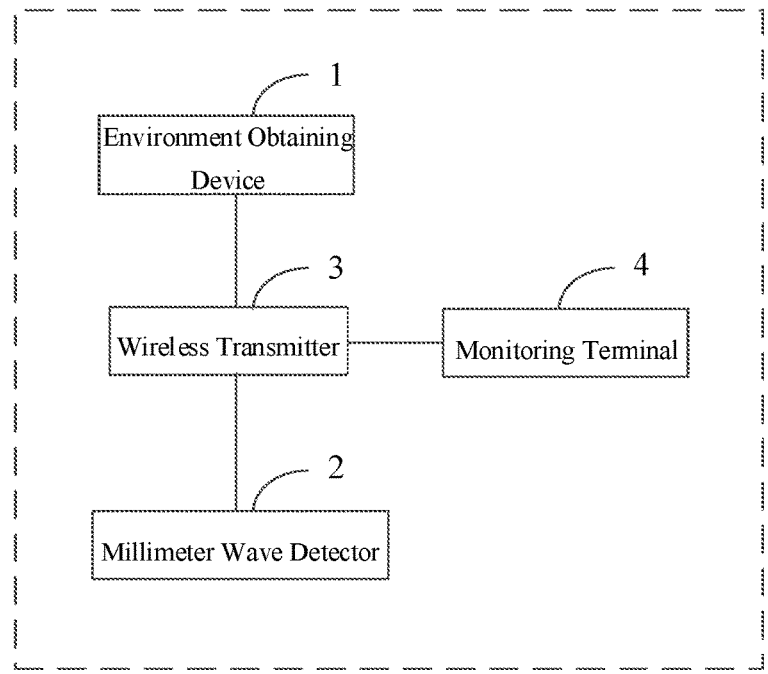
FIG. 1 is a schematic view of a system for millimeter wave-based fire detecting and rescuing according to an embodiment of the present disclosure.

Referring to FIG. 1, FIG. 1 is a schematic view of a system for millimeter wave-based fire detecting and rescuing according to an embodiment of the present disclosure. As shown in FIG. 1, a system for millimeter wave-based fire detecting and rescuing 10 includes an environmental obtaining device 1, a millimeter wave detector 2, a wireless transmitter 3, and a monitoring terminal 4.

In the embodiment, the environmental obtaining device 1, the millimeter wave detector 2 and the wireless transmitter 3 are interconnected and arranged in an environment to be detected.

Figure 2:
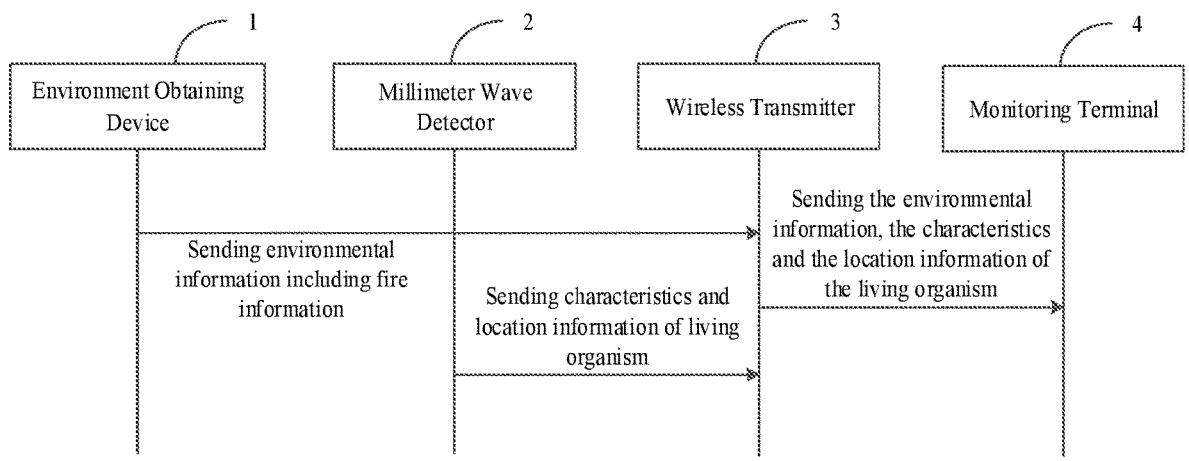
FIG. 2 is a signal flow chart of a system for millimeter wave-based fire detecting and rescuing according to an embodiment of the present disclosure.

Referring to FIG. 2. FIG. 2 is a signal flow chart of a system for millimeter wave-based fire detecting and rescuing according to an embodiment of the present disclosure.

In the embodiment, the environmental obtaining device 1 is configured to collect current environmental information and send the environmental information to the wireless transmitter 3 when the environmental information is determined to include fire information. The millimeter wave detector 2 is configured to perform the all-weather scanning on the environment to be detected to obtain characteristics and location information of a living organism in the environment to be detected, and send the characteristics and the location information of the living organism to the wireless transmitter 3. The wireless transmitter 3 is configured to report the environmental information, the characteristics and the location information of the living organism to the monitoring terminal 4 through the millimeter wave, such that the monitoring terminal 4 stores the characteristics and the location information of the living organism. The monitoring terminal 4 continuously compares the changes in the characteristics and the location information of the living organism detected by the millimeter wave before and during the fire, such that the living organism may be searched and rescued based on the changes.

Specifically, the millimeter wave detector 2 is configured to all-weather scan the environment to be detected, and capable of reporting millimeter wave scanning information obtained from all-weather scanning to the monitoring terminal 4 through the wireless transmitter 3. In this way, the monitoring terminal 4 stores all-weather millimeter wave scanning information. After a fire occurs, the monitoring terminal 4 may be applied to retrieve the millimeter wave scanning information before the fire occurs and the currently obtained millimeter wave scanning information to make a comparison therebetween, thereby obtaining the change of state of the living organism before and after the fire, so as to conduct more accurate search and rescue of the living organism, save the search and rescue time, and reduce the chance of the living organism in danger.

In the embodiment, a millimeter wave detection technique is configured to obtain the characteristics and location information of the living organism in the environment to be detected.

Millimeter wave is an electromagnetic wave between microwave and far infrared, with a frequency of 30 GHz-300 GHz and a wavelength of 1 mm-10 mm.

Specifically, millimeter wave can work around the clock and has characteristics such as high resistance to smoke, high resolution, etc. The millimeter wave is thus independent of temperature, weather and other environmental influences.

In the embodiment, millimeter wave communication is configured to report the collected information to the monitoring terminal 4.

The millimeter wave communication refers to communication using millimeter wave as the carrier for transmitting information.

In the embodiment, the millimeter wave communication is applied to provide intensive high-speed data services within a certain range, report the collected environmental information, characteristics and location information of living organism to the monitoring terminal 4 in real time, and store the information collected by the millimeter wave around the clock through the monitoring terminal 4. In this way, the data may be retrieved at any time during rescue to view changes in the status of people in the current environment and to develop a sophisticated rescue plan based on the changes.

Compared with the related art, in the present disclosure, an environmental obtaining device, millimeter wave detector and wireless transmitter interconnected with each other are arranged in the environment to be detected to overcome the interference of temperature, smoke and flame in the environment when the fire is rapid and harsh. Moreover, the location information of trapped persons may be accurately obtained based on the millimeter wave detection technology, and message may be transmitted to the monitoring terminal in real time based on the millimeter wave communication. The system for millimeter wave-based fire detecting and rescuing provided in the present disclosure may provide accurate technical support after a fire occurs such that firefighters can rescue trapped persons in a timely and accurate manner and provide a guarantee for safe rescue. Furthermore, an all-weather scanning on the environment to be detected is performed through the millimeter wave detector to obtain the life characteristics, the number, and the location information of trapped persons in the environment to be detected. The information is transmitted to the monitoring terminal through the millimeter wave, and the monitoring terminal stores the data transmitted by the millimeter wave, such that rescuers at the monitoring terminal can know the overall condition of the trapped persons in the environment to be detected before and after the fire by retrieving the millimeter wave data, and develop a sophisticated rescue plan based on the changes in the state of the trapped persons before and after the fire, thus reducing the rescue time and the chance of the living organism in danger.

Figure 3:
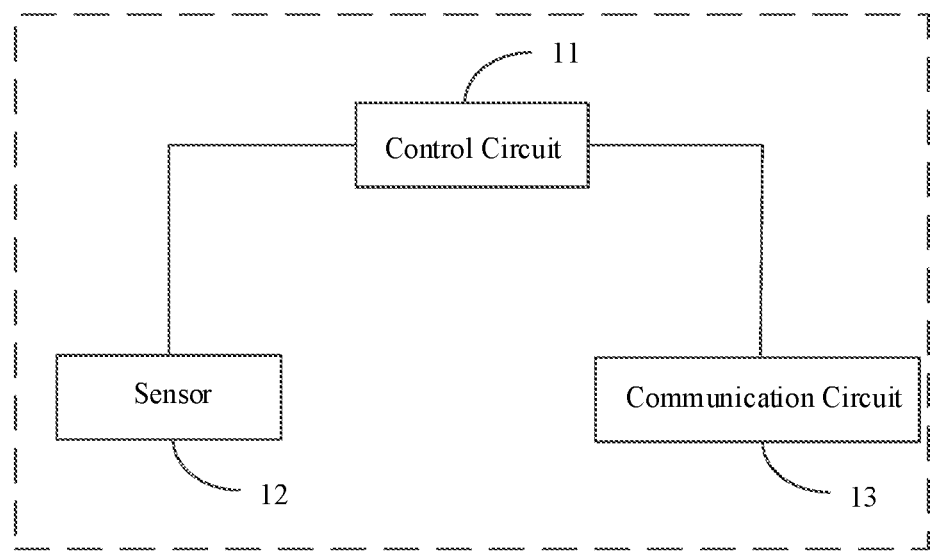
FIG. 3 is a structural schematic view of an environmental obtaining device of a system for millimeter wave-based fire detecting and rescuing according to an embodiment of the present disclosure.

Referring further to FIG. 3, FIG. 3 is a structural schematic view of an environmental obtaining device of a system for millimeter wave-based fire detecting and rescuing according to an embodiment of the present disclosure. As shown in FIG. 3, in the embodiment, the environment obtaining device 1 includes a control circuit 11, a sensor 12, and a communication circuit 13, both the sensor 12 and the communication circuit 13 being coupled to the control circuit 11.

The sensor 12 is configured to collect environmental information in the environment to be detected. The control circuit 11 is configured to send the environmental information to the wireless transmitter 3 via the communication circuit 13 when the environmental information is determined to include fire information.

The sensor 12 may include at least one of an infrared sensor, a temperature sensor, a smoke sensor, and a camera.

The fire information may include at least one of the temperature of the environment to be detected being higher than a set temperature, the smoke concentration being higher than a set concentration, and the flame area being greater than a determined area threshold.

In the embodiment, the environmental obtaining device 1 can send the environmental information including fire information to the wireless transmitter 3 in a timely manner when a fire has just occurred, such that firefighters are aware of the specific layout of the environment to be detected and facilitate subsequent rescue.

In other embodiments, when the environmental information does not include fire information, the environmental obtaining device 1 may send the environmental information to the monitoring terminal via 4G transmission technology to avoid taking up the bandwidth of the millimeter wave.

Figure 4:
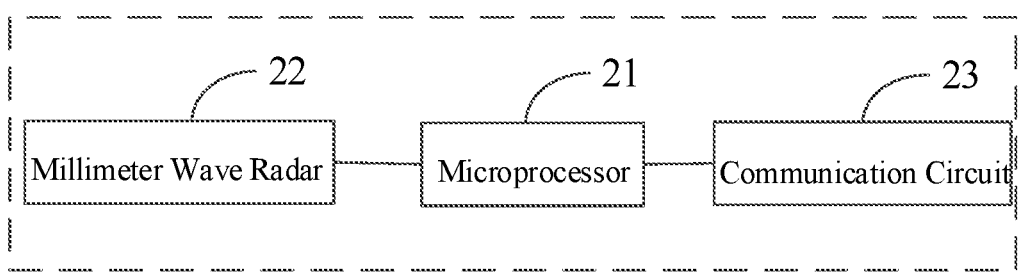
FIG. 4 is a structural schematic view of a millimeter wave detector of a system for millimeter wave-based fire detecting and rescuing according to an embodiment of the present disclosure.

Referring further to FIG. 4, FIG. 4 is a structural schematic view of a millimeter wave detector of a system for millimeter wave-based fire detecting and rescuing according to an embodiment of the present disclosure. As shown in FIG. 4, the millimeter wave detector 2 includes a microprocessor 21, a millimeter wave radar 22 and a communication circuit 23, the millimeter waver radar 22 and the communication circuit 23 being coupled to the microprocessor 21.

The millimeter wave radar 22 is configured to perform the all-weather scanning on the environment to be detected. The microprocessor 21 is configured to control the millimeter wave radar 22 to turn on the all-weather scanning, and to analyze and process and save the millimeter wave transmitted and received by the millimeter wave radar 22 to obtain the characteristics and the location information of the living organism. The communication circuit 23 is configured to send the characteristics and the location information of the living organism to the wireless transmitter 3.

The millimeter wave radar 22 may include a millimeter wave antenna. The millimeter wave radar 22 transmits the millimeter wave and receives the millimeter wave back through the millimeter wave antenna.

The millimeter wave detector 2 may include at least one millimeter wave radar 22.

Specifically, one millimeter wave radar 22 can cover a 45° range in the environment to be detected. A plurality of millimeter wave radars 22 are arranged in the millimeter wave detector 2, such that the detection range of the millimeter wave detector 2 may be wider. The present disclosure does not limit the specific number of millimeter wave radars 22 specifically.

The living organism may include people or animals in the environment to be tested.

The characteristics of the living organism include information such as limb movement and human activity.

In the embodiment, the microprocessor 21 controls the millimeter wave radar 22 to transmit a periodically linearly increasing frequency-modulation (FM) continuous wave, obtain the frequency of an intermediate frequency (IF) wave mixed of the frequency of the transmitted periodically linearly increasing FM continuous wave signal and the frequency of a reflected echo signal of the life organism target, and perform a fast Fourier transform (FFT) based on the frequency of the wave to obtain a distance profile map in the environment to be detected.

Specifically, the millimeter wave radar 22 emits the periodically linearly increasing FM continuous wave (i.e. the millimeter wave signal) into the environment. The signal is reflected when an object in the irradiation path of the millimeter wave signal blocks the millimeter wave signal. The microprocessor 21 may analyze a Doppler map generated by the frequency of the signal through an algorithm by receiving the reflected signal and determine whether the object is a living organism based on a profile drawn in the map. The millimeter wave is not affected by smoke and is not limited to the proximity limit. Thus a detection can be constantly performed even in a complex fire environment. The more times the detection of the environment, the more signals the microprocessor 21 receives back in reflection, and the clearer the profile of the detected object.

Further, the microprocessor 21 performs phase detection, screening, and extraction of all points based on the distance profile map in the environment to be detected, and performs phase expansion to determine the phase difference to obtain a displacement map of the detected object. The microprocessor 21 performs a band-pass filtering based on the displacement map of the detected object and compares the displacement map of the detected object to determine whether the detected object has the characteristics of a living organism.

Further, after determining that the detected object has the characteristics of a living organism, the microprocessor 21 detects and filters all the points based on the distance profile map in the environment to be detected to obtain a point cloud with distance, azimuth and Doppler attributes. The microprocessor 21 composes a tracker frame by frame and outputs a tracking result based on the point cloud, and perform a feature extraction on a trajectory attribute concluded from the tracking result to determine the location information of the life organism in the environment to be detected.

In the embodiment, the millimeter wave detector 2 can overcome the interference of temperature, smoke and flame in the environment after a fire has occurred and when the fire is expanding in a harsh environment to accurately obtain the location information of trapped persons. The millimeter wave detector 2 sends the collected characteristics and the location information of the trapped persons in the environment to be detected to the wireless transmitter 3, such that firefighters can combine the layout of the environment to be detected and specific information about the trapped persons to develop a rescue plan with the highest safety factor in the shortest possible time.

In the embodiment, the millimeter wave detector 2 is configured to perform the all-weather scanning on the environment to be detected, such that at any moment the number and location information of people in the environment may be transmitted to the monitoring terminal through the millimeter wave in a timely manner. After the fire, rescuers can know the overall condition of the trapped people in the environment to be detected before and after the fire by retrieving the millimeter wave data from the background monitoring terminal and comparing the millimeter wave data with the status and characteristics of the trapped persons stored before the fire, and develop a precise rescue plan accordingly.

In a specific implementation scenario, before a fire occurs, the millimeter wave detector 2 counts the number of people in a room as 10 and obtains the exact location of all the people in the room.

For example, there are 4 or 5 children among the 10 people playing hide-and-seek in the room, and the children hide in locations that are usually hidden, such as under the table, under the bed, and in the cabinets. The camera cannot obtain the location of the children, and the infrared sensor is limited by the distance and cannot accurately track the children and produce the distribution image of red radiation. However, the millimeter wave detector 2 can obtain the vital characteristics and the location information of each child and quickly transmit the information to the monitoring terminal through the millimeter wave. In this way, the monitoring terminal may store the information collected by the millimeter wave and thus be able to compare the information with the millimeter wave scan information before the fire occurred.

When there is a hidden child fainting or weakened breathing at the time of the fire, and the millimeter wave detector 2 cannot accurately obtain the vital characteristics via the profile map which causes that it is not impossible to determine whether the profile map corresponds to the trapped person. In this case, by retrieving the millimeter wave data before the fire, it is possible to know that there is a child hidden under the table or in the cabinet, such that the fainting child can be rescued in a timely manner, saving the search and rescue time, and reducing the chance of the child in danger.

Referring to FIG. 1, in the embodiment, the wireless transmitter 3 includes a millimeter wave antenna. The wireless transmitter 3 reports the environmental information, the characteristics and location information of the living organism to the monitoring terminal 4 via the millimeter wave antenna.

As the number of devices connected to wireless networks increases, the problem of scarcity of spectrum resources is becoming more and more prominent. The limited bandwidth shared on the available spectrum greatly affects the rate of wireless transmission. There are usually two ways to increase the transmission rate of wireless transmission, one is to increase the spectrum utilization and the other is to increase the spectrum bandwidth. The method of increasing the spectrum bandwidth is simpler and more direct compared to increasing the spectrum utilization. In the case of constant spectrum utilization, doubling the bandwidth can double the data transmission rate as well.

The commonly used bands below 5 GHz are already very crowded, but in the millimeter wave band, the 60 GHz band is one of the bands available for 5G. The available signal bandwidth of each channel in the 60 GHz band reaches 2 GHz, whereas the carrier of the highest frequency in the 4G-LTE band is about 2 GHz, while the available spectrum bandwidth is only 100 MHz. Therefore, when using the Millimeter wave band, the spectrum bandwidth may be expanded by 10 times, and the transmission rate may be greatly improved accordingly.

In the embodiment, the wireless transmitter 3 transmits information by transmitting the millimeter wave through the millimeter wave antenna to report the received environmental information, the characteristics and location information of the living organism to the monitoring terminal 4 at the fastest speed, thus achieving the purpose of real-time data transmission.

In practice, since the millimeter wave attenuate quickly in the air and have a weak bypass capability, the millimeter wave does not easily pass through buildings or obstacles. Therefore, a micro base station is required to enhance the millimeter wave transmission.

In the embodiment, at least one micro base station is arranged outside the environment to be detected. A transmitter of the millimeter wave antenna in the wireless transmitter 3 is ensured to face a receiver in the micro base station. The transmitter in the micro base station is ensured to face the receiver in the monitoring terminal 4. In this way, the millimeter wave can be transmitted point-to-point among the wireless transmitter 3, the at least one micro base station, and the monitoring terminal 4 without being limited by obstacles.

In a specific implementation scenario, one or more micro base stations are arranged outside of the room or floor. Specifically, micro base stations are arranged outside different rooms or different floors. The angle between the wireless transmitter 3 and the corresponding micro base station deployed in different rooms or different floors is adjusted to enable an ultra-high speed data transmission between the wireless transmitter 3 and the micro base station as well as the monitoring terminal 4.

Existing wireless communication bands belong to low frequency and transmit data at a slow speed, while the present disclosure applies the millimeter wave with very high bandwidth to transmit data. In this way, fire scene information may be transmitted to the monitoring terminal in real time, providing a real-time technical support to firefighters to obtain fire scene information and carry out fire rescue in a timely manner, greatly reducing the difficulty of rescue.

In some embodiments, the system 10 for millimeter wave-based fire detecting and rescuing provided by the present disclosure further includes an alarm configured to receive the fire information and perform an alarm output.

When the environmental obtaining device 1 determines that the collected environmental information includes fire information, the control circuit 11 sends the fire information to the alarm to cause the alarm to receive the fire information and perform an alarm output.

Specifically, after the infrared sensor or the temperature sensor detects that the temperature in the environment exceeds 30° C. and the control circuit 11 determines that the environmental information includes the fire information, the control circuit 11 sends the fire information to the alarm to cause the alarm to receive the fire information and perform the alarm output. For another example, after the smoke sensor detects that the smoke concentration reaches 0.65% FT and the control circuit 11 determines that the environmental information includes the fire information, the control circuit 11 sends the fire information to the alarm to cause the alarm to receive the fire information and perform the alarm output. For further another example, after the camera detects that the flame area exceeds 0.01 $m^2$ and the control circuit 11 determines that the environmental information includes the fire information, the control circuit 11 sends the fire information to the alarm to cause the alarm to receive the fire information and perform the alarm output.

In the embodiment, the fire information is detected at the beginning of the fire and the alarm output is performed in time by the alarm, which enables firefighters to arrive at the scene as soon as possible, reducing the damage caused by the fire.

Figure 5:
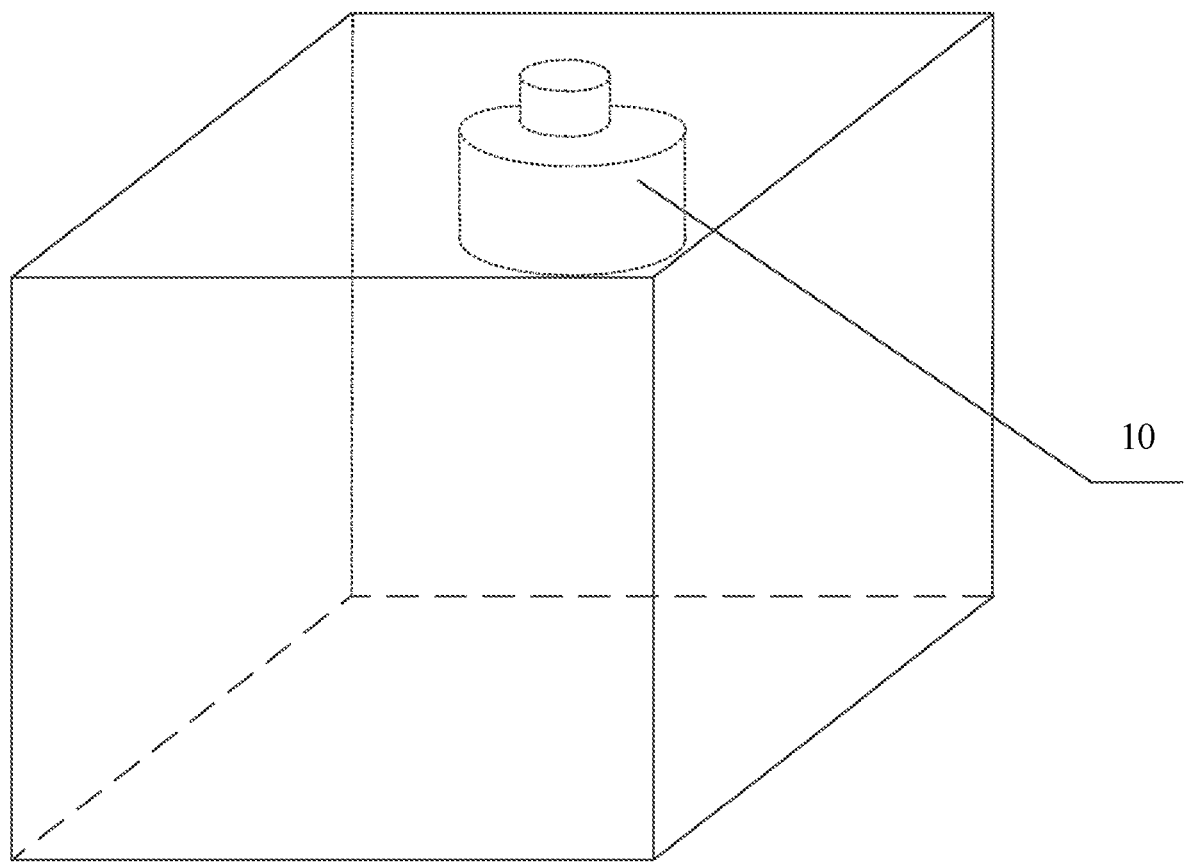
FIG. 5 is a schematic view of an installation of a system for millimeter wave-based fire detecting and rescuing according to an embodiment of the present disclosure.

Referring to FIG. 5, FIG. 5 is a schematic view of an installation of a system for millimeter wave-based fire detecting and rescuing according to an embodiment of the present disclosure. As shown in FIG. 5, in the embodiment, the system 10 for millimeter wave-based fire detecting and rescuing is arranged at a highest position of the environment to be detected.

The environmental obtaining device 1 and the millimeter wave detector 2 are accordingly arranged at the highest position of the environment to be detected.

In the embodiment, the environmental obtaining device 1 and the millimeter wave detector 2 are arranged at the highest position of the environment to be detected, which enables the sensor 12 and the millimeter wave radar 22 to detect a larger range and a wider area covered by the millimeter wave to obtain as much information as possible about the environment, the characteristics and the location information of the living organism in the environment to be detected.

In other embodiments, the system 10 for millimeter wave-based fire detecting and rescuing may also be arranged at other positions of the environment to be detected. For example, the system 10 for millimeter wave-based fire detecting and rescuing is arranged on an interior wall of a room that is not a top wall, simply ensuring that people walking around will not interfere with the millimeter wave emitted and received by the millimeter wave detector 2.

Figure 6:
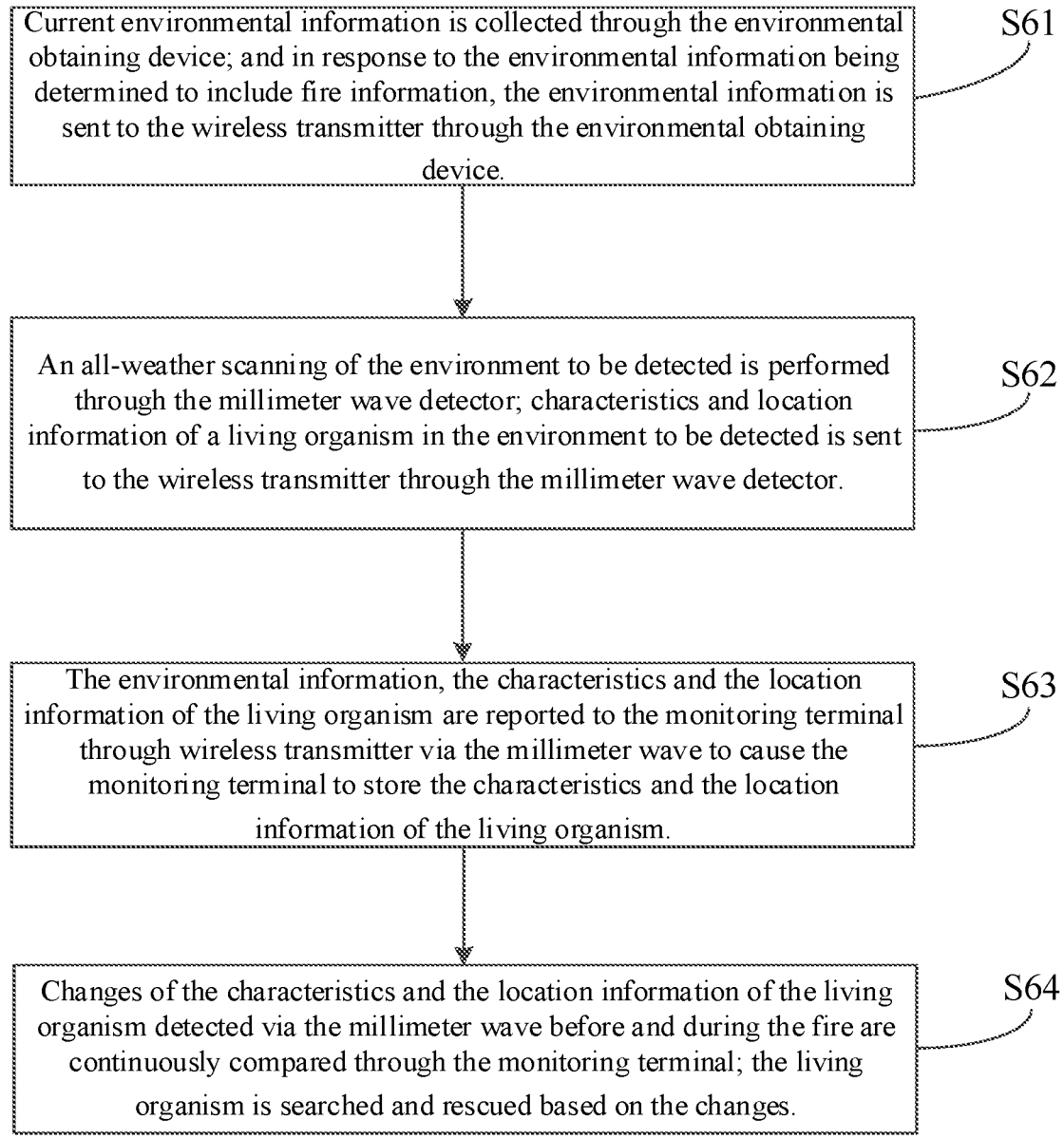
FIG. 6 is a flow chart of a method for millimeter wave-based fire detecting and rescuing according to an embodiment of the present disclosure.

Referring to FIG. 6, FIG. 6 is a flow chart of a method for millimeter wave-based fire detecting and rescuing according to an embodiment of the present disclosure. In the embodiment, the method is implemented by a system for millimeter wave-based fire detecting and rescuing, which includes an environmental obtaining device, a millimeter wave detector, a wireless transmitter, and a monitoring terminal. The environmental obtaining device, the millimeter wave detector, and the wireless transmitter are interconnected and arranged in the environment to be detected. The method specifically includes operations at blocks illustrated in FIG. 6.

At block S61: Current environmental information is collected through the environmental obtaining device; and in response to the environmental information being determined to include fire information, the environmental information is sent to the wireless transmitter through the environmental obtaining device.

In the embodiment, the environmental obtaining device includes a control circuit, and a sensor, and a communication circuit, both the sensor and the communication circuit being coupled to the control circuit.

In the embodiment, the environmental information in the environment to be detected is collected by the sensor.

Specifically, the sensor may include at least one of an infrared sensor, a temperature sensor, a smoke sensor, and a camera.

An ambient temperature is obtained through the temperature sensor.

A smoke concentration in the environment to be detected is obtained through the smoke sensor.

Further, the control circuit analyzes and determines whether the environmental information collected by the sensor includes the fire information. When it is determined that the environmental information includes the fire information, the environmental information is sent to the wireless transmitter via the communication circuit.

In the embodiment, the environment to be tested may include a building room or floor corridor.

The environmental information may include the collected temperature, smoke concentration, flame area of the environment to be detected, and the spatial layout and the density of people.

The fire information may include at least one of the temperature of the environment to be detected being higher than a set temperature, the smoke concentration being higher than a set concentration, and the flame area being greater than a determined area threshold.

At block S62: An all-weather scanning on the environment to be detected is performed through the millimeter wave detector; characteristics and location information of a living organism in the environment to be detected is sent to the wireless transmitter through the millimeter wave detector.

In the embodiment, the millimeter wave detector includes a microprocessor, a millimeter wave radar and a communication circuit, the millimeter waver radar and the communication circuit being coupled to the microprocessor.

The millimeter wave radar may include a millimeter wave antenna. The millimeter wave radar transmits the millimeter wave and receives the millimeter wave back through the millimeter wave antenna.

In the embodiment, at least one millimeter wave radar is integrated in the millimeter wave detector.

Specifically, one millimeter wave radar can cover a 45° range in the environment to be detected. A plurality of millimeter wave radars are arranged in the millimeter wave detector, such that the detection range of the millimeter wave detector may be wider. The present disclosure does not limit the specific number of millimeter wave radars specifically.

The living organism may include people or animals in the environment to be tested.

The characteristics of the living organism include information such as limb movement and human activity.

In the embodiment, the all-weather scanning on the environment to be detected is performed through the millimeter wave detector The microprocessor controls the millimeter wave radar to turn on the all-weather scanning, analyzes and processes the millimeter wave emitted by the millimeter wave radar and the millimeter wave received back to obtain the characteristics and location information of the living organism, and sends the characteristics and location information of the living body to the wireless transmitter through the communication circuit.

At block S63: The environmental information, the characteristics and the location information of the living organism are reported to the monitoring terminal through the wireless transmitter via the millimeter wave to cause the monitoring terminal to store the characteristics and the location information of the living organism.

In the embodiment, the wireless transmitter includes a millimeter wave antenna.

In the embodiment, the environmental information sent by the environmental obtaining device and the characteristics and location information of the life organism sent by the millimeter wave detector are received by the wireless transmitter. The wireless transmitter is controlled to report the environmental information, the characteristics and the location information of the living organism to the monitoring terminal via the millimeter wave.

At block S64: Changes of the characteristics and the location information of the living organism detected via the millimeter wave before and during the fire are continuously compared through the monitoring terminal; the living organism is searched and rescued based on the changes.

In the embodiment, the millimeter wave detector is configured to perform the all-weather scanning on the environment to be detected, such that at any moment the number and location information of people in the environment may be transmitted to the monitoring terminal through the millimeter wave in a timely manner. After the fire, rescuers can know the overall condition of the trapped people in the environment to be detected before and after the fire by retrieving the millimeter wave data from the background monitoring terminal and comparing the millimeter wave data with the status and characteristics of the trapped persons stored before the fire, and develop a precise rescue plan accordingly.

In a specific implementation scenario, before a fire occurs, the millimeter wave detector 2 counts the number of people in a room as 10 and obtains the exact location of all the people in the room.

For example, there are 4 or 5 children among the 10 people playing hide-and-seek in the room, and the children hide in locations that are usually hidden, such as under the table, under the bed, and in the cabinets. The camera cannot obtain the location of the children, and the infrared sensor is limited by the distance and cannot accurately track the children and produce the distribution image of red radiation. However, the millimeter wave detector 2 can obtain the vital characteristics and the location information of each child and quickly transmit the information to the monitoring terminal through the millimeter wave. In this way, the monitoring terminal may store the information collected by the millimeter wave and thus be able to compare the information with the millimeter wave scan information before the fire occurred.

When there is a hidden child fainting or weakened breathing at the time of the fire, and the millimeter wave detector 2 cannot accurately obtain the vital characteristics via the profile map which causes that it is not impossible to determine whether the profile map corresponds to the trapped person. In this case, by retrieving the millimeter wave data before the fire, it is possible to know that there is a child hidden under the table or in the cabinet, such that the fainting child can be rescued in a timely manner, saving the search and rescue time, and reducing the chance of the child in danger.

Compared with the related art, in the present disclosure, an environmental obtaining device, millimeter wave detector and wireless transmitter interconnected with each other are arranged in the environment to be detected to overcome the interference of temperature, smoke and flame in the environment when the fire is rapid and harsh. Moreover, the location information of trapped persons may be accurately obtained based on the millimeter wave detection technology, and message may be transmitted to the monitoring terminal in real time based on the millimeter wave communication. The system for millimeter wave-based fire detecting and rescuing provided in the present disclosure may provide accurate technical support after a fire occurs such that firefighters can rescue trapped persons in a timely and accurate manner and provide a guarantee for safe rescue. Furthermore, an all-weather scanning on the environment to be detected is performed through the millimeter wave detector to obtain the life characteristics, the number, and the location information of trapped persons in the environment to be detected. The information is transmitted to the monitoring terminal through the millimeter wave, and the monitoring terminal stores the data transmitted by the millimeter wave, such that rescuers at the monitoring terminal can know the overall condition of the trapped persons in the environment to be detected before and after the fire by retrieving the millimeter wave data, and develop a sophisticated rescue plan based on the changes in the state of the trapped persons before and after the fire, thus reducing the rescue time and the chance of the living organism in danger.

The above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed is:

1. A system for millimeter wave-based fire detecting and rescuing, comprising: an environmental obtaining device, a millimeter wave detector, a wireless transmitter, and a monitoring terminal; wherein the environmental obtaining device, the millimeter wave detector and the wireless transmitter are interconnected and arranged in an environment to be detected;
   the environmental obtaining device is configured to collect environmental information and send the environmental information to the wireless transmitter in response to the environmental information being determined to include fire information;
   the millimeter wave detector is configured to perform an all-weather scanning on the environment to be detected to obtain characteristics and location information of a living organism in the environment to be detected, and send the characteristics and the location information of the living organism to the wireless transmitter;
   the wireless transmitter is configured to report the environmental information, the characteristics and the location information of the living organism to the monitoring terminal through a millimeter wave to cause the monitoring terminal to store the characteristics and the location information of the living organism;
   the monitoring terminal is configured to continuously compare changes in the characteristics and the location information of the living organism detected by the millimeter wave before and during a fire, such that the living organism is searched and rescued based on the changes.

2. The system according to claim 1, wherein the millimeter wave detector comprises a microprocessor, at least one millimeter wave radar and a communication circuit, the at least one millimeter waver radar and the communication circuit being coupled to the microprocessor;
   the at least one millimeter wave radar is configured to perform the all-weather scanning on the environment to be detected; the microprocessor is configured to control the at least one millimeter wave radar to turn on the all-weather scanning and to analyze, process and save the millimeter wave transmitted and received by the at least one millimeter wave radar to obtain the characteristics and the location information of the living organism; the communication circuit is configured to send the characteristics and the location information of the living organism to the wireless transmitter.

3. The system according to claim 2, wherein the at least one millimeter wave radar comprises a millimeter wave antenna; the at least one millimeter wave radar transmits the millimeter wave and receives the millimeter wave back through the millimeter wave antenna.

4. The system according to claim 3, wherein each of the at least one millimeter wave radar covers a range with a coverage angle of 45° in the environment to be detected.

5. The system according to claim 2, wherein the microprocessor is configured to:
control the millimeter wave radar to transmit a periodically linearly increasing frequency-modulation continuous wave;
control the millimeter wave radar to obtain a frequency of an intermediate frequency wave, the frequency of the intermediate frequency wave being mixed of a frequency of the transmitted periodically linearly increasing frequency-modulation continuous wave signal and a frequency of a reflected echo signal of an object; and
control the millimeter wave radar to perform a fast Fourier transform based on the frequency of the intermediate frequency wave to obtain a distance profile map in the environment to be detected.

6. The system according to claim 5, wherein the microprocessor is further configured to:
perform a phase detection, a screening, and an extraction of all points based on the distance profile map in the environment to be detected;
perform a phase expansion to determine a phase difference to obtain a displacement map of the object;
perform a band-pass filtering based on the displacement map of the object; and
compare the displacement map of the object to determine whether the object has the characteristics of the living organism.

7. The system according to claim 6, wherein the microprocessor is further configured to, in response to the object being determined to have the characteristics of the living organism,
detect and filter all the points based on the distance profile map in the environment to be detected to obtain a point cloud with distance, azimuth and Doppler attributes;
compose a tracker frame by frame and output a tracking result based on the point cloud; and
perform a feature extraction on a trajectory attribute concluded from the tracking result to determine the location information of the object in the environment to be detected.

8. The system according to claim 1, wherein the environment obtaining device comprises a control circuit, a sensor, and a communication circuit, both the sensor and the communication circuit being coupled to the control circuit.

9. The system according to claim 8, wherein the sensor comprises at least one of an infrared sensor, a temperature sensor, a smoke sensor, and a camera.

10. The system according to claim 8, wherein the fire information comprises at least one of:
a temperature of the environment to be detected being higher than a set temperature, a smoke concentration of the environment to be detected being higher than a set concentration, and a flame area of the environment to be detected being greater than a determined area threshold.

11. The system according to claim 1, wherein the wireless transmitter comprises a millimeter wave antenna: the wireless transmitter reports the environmental information, the characteristics and the location information of the living organism to the monitoring terminal through the millimeter wave antenna.

12. The system according to claim 11, wherein at least one micro base station is arranged outside the environment to be detected, a transmitter of the millimeter wave antenna of the wireless transmitter being arranged to face a receiver of the micro base station, a transmitter of the micro base station being arranged to face a receiver of the monitoring terminal.

13. The system according to claim 1, further comprising an alarm configured to receive the fire information and perform an alarm output.

14. The system according to claim 1, wherein the environmental obtaining device and the millimeter wave detector are arranged at a highest position of the environment to be detected.

15. The system according to claim 1, wherein the environmental obtaining device is further configured to send the environmental information to the monitoring terminal via a 4G transmission technology in response to the environmental information being determined not to include the fire information.

16. A method for millimeter wave-based fire detecting and rescuing, implemented by a system for millimeter wave-based fire detecting and rescuing, the system comprising an environmental obtaining device, a millimeter wave detector, a wireless transmitter, and a monitoring terminal; wherein the environmental obtaining device, the millimeter wave detector and the wireless transmitter are interconnected and arranged in an environment to be detected; wherein the method comprises:
collecting environmental information through the environmental obtaining device; and in response to the environmental information being determined to include fire information, sending the environmental information to the wireless transmitter through the environmental obtaining device;
performing an all-weather scanning on the environment to be detected through the millimeter wave detector; and sending characteristics and location information of a living organism in the environment to be detected to the wireless transmitter through the millimeter wave detector;
reporting the environmental information, the characteristics and the location information of the living organism to the monitoring terminal through the wireless transmitter via a millimeter wave to cause the monitoring terminal to store the characteristics and the location information of the living organism; and
continuously comparing changes of the characteristics and the location information of the living organism detected via the millimeter wave before and during the fire through the monitoring terminal; and searching and rescuing the living organism based on the changes.

17. The method according to claim 16, wherein the millimeter wave detector comprises a microprocessor, at least one millimeter wave radar and a communication circuit, the at least one millimeter waver radar and the communication circuit being coupled to the microprocessor;

wherein the performing the all-weather scanning on the environment to be detected through the millimeter wave detector; and sending the characteristics and the location information of the living organism in the environment to be detected to the wireless transmitter through the millimeter wave detector comprise:

performing the all-weather scanning on the environment to be detected through the at least one millimeter wave radar;

controlling, by the microprocessor, the at least one millimeter wave radar to turn on the all-weather scanning and to analyze, process and save the millimeter wave transmitted and received by the at least one millimeter wave radar to obtain the characteristics and the location information of the living organism;

sending the characteristics and the location information of the living organism to the wireless transmitter through the communication circuit.

18. The method according to claim 16, wherein the environment obtaining device comprises a control circuit, a sensor, and a communication circuit, both the sensor and the communication circuit being coupled to the control circuit.

19. The method according to claim 18, wherein the sensor comprises at least one of an infrared sensor, a temperature sensor, a smoke sensor, and a camera.

20. The method according to claim 18, wherein the fire information comprises at least one of: a temperature of the environment to be detected being higher than a set temperature, a smoke concentration of the environment to be detected being higher than a set concentration, and a flame area of the environment to be detected being greater than a determined area threshold.

* * * * *